(No Model.)
T. BURKHARD.
CANDY HEATER.
No. 287,621.  Patented Oct. 30, 1883.
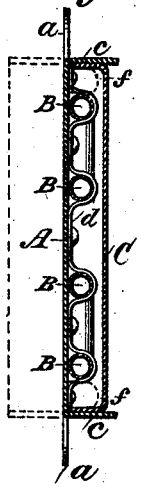
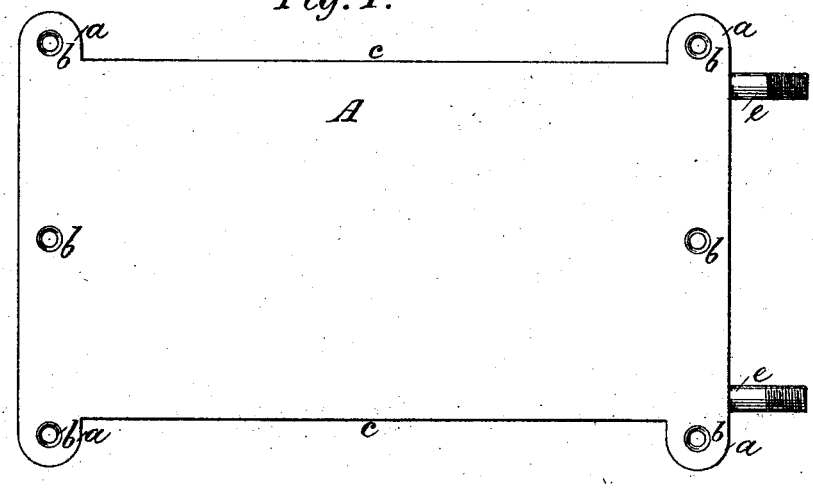
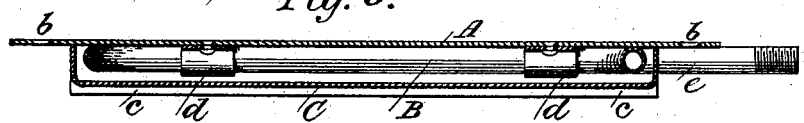
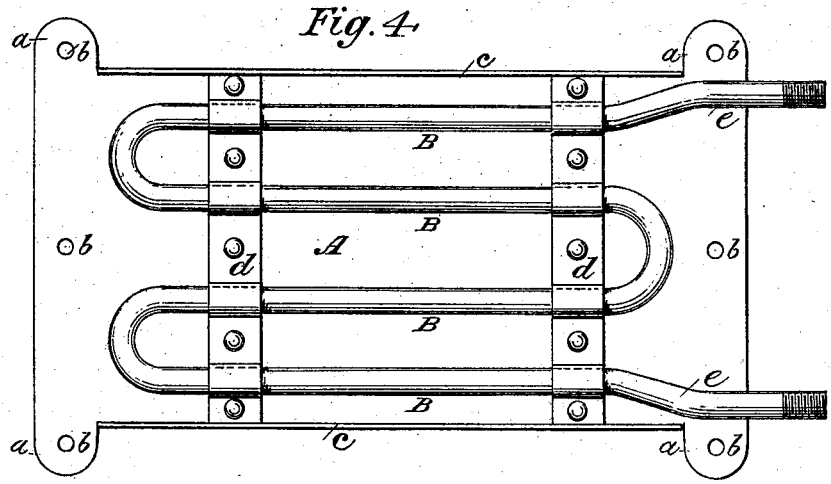
Witnesses
Ed. L. Moran
Geo. Wadman
Inventor
Thomas Burkhard
by his Attorneys
Brown & Brown

UNITED STATES PATENT OFFICE.

THOMAS BURKHARD, OF BROOKLYN, NEW YORK.

CANDY-HEATER.

SPECIFICATION forming part of Letters Patent No. 287,621, dated October 30, 1883.

Application filed September 15, 1883. (No model.)

*To all whom it may concern:*

Be it known that I, THOMAS BURKHARD, of the city of Brooklyn, in the county of Kings and State of New York, have invented a new and useful Improvement in Candy-Heaters, of which the following is a specification, reference being had to the accompanying drawings.

My invention relates to what are known as "candy-heaters," which are used in candy-manufacturing establishments for heating candy, to soften it preparatory to its being pulled or spun out into sticks, and for melting it preparatory to its being made into caramels or other forms. The candy-heater in present use consists of a box, ordinarily made of thin sheet-copper, upon the face or top of which the candy to be heated is placed and heated by means of steam admitted to the interior of the box. The box is usually fitted into a table, so that the top forms a part thereof and is level with it. It is found in practice that when steam is admitted to this box to heat it, the plate forming the top thereof, upon which the candy is heated, is caused by the pressure of the steam to assume a convex form, and, as a flat surface is desirable, the efficiency of the heater is thereby greatly impaired.

The object of my invention is to provide a heater which will be free from the above-mentioned defect; and to this end it consists of a plate of metal, preferably of copper, on account of its high heat-conducting properties, having a steam-pipe, of serpentine or coiled form, strapped and riveted to or otherwise firmly secured to its back. The steam for heating the plate is admitted to this pipe, and serves to heat the said plate, and the heating is not only accomplished without any tendency to bend the plate, but the latter is stiffened by the pipe, and so rendered more durable. The said plate is preferably inclosed below by a plate of zinc or other metal, having relatively low heat-conducting power, in order to confine the heat. For what is termed a "stick-candy heater," on which candy is simply heated to soften it for pulling, the plate needs no rim above its surface; but a heater for melting chocolate or other candy requires an upturned rim all around its edges.

In the drawings, Figure 1 is a plan of a stick-candy heater constructed according to my invention. Fig. 2 is a transverse section of the same, showing also by dotted lines the modification of the heating-plate shown in Fig. 1 necessary to form what is known as a "chocolate-candy heater." Fig. 3 is a longitudinal vertical section corresponding with Fig. 1. Fig. 4 is an inverted plan with plate for inclosing the pipe removed.

Similar letters of reference indicate like parts in the several views.

A designates a plate upon which the candy to be heated is to be placed, having lugs or projections $a$ and countersunk holes $b$, to receive screws, by which it is secured to a table, into which the heater is fitted, so as to bring the surface of the plate A flush therewith. The two edges $c\ c$ of this plate, between the lugs $a$, are turned downward, forming sides, which serve to hold a plate, C, for inclosing the steam-pipe B, by which the plate is heated. This pipe is represented in the form of a serpentine coil; but it may be of other coiled form, and it is fastened tightly against the plate A by means of the metal straps $d\ d$, which are riveted to the said plate. The straps may extend all across from side to side of the top plate, A, and be bent inward between the turns of the pipe, to lie against the said plate, as shown in the drawings; or, instead of the straps extending across from side to side of the plate A, a number of short straps may be used, each extending only over the back of one single turn of the pipe, and bent to lie against and be riveted to the plate A. The plate inclosing the pipe B is turned upward on all four edges, to form sides of sufficient depth to inclose the coil of pipe B, and notches $f\ f$ are made in it for those parts $e\ e$ of the pipe, by which the steam is admitted to and escapes from the coil, such parts being both suitably connected with a boiler, or one with a boiler and the other with a steam-trap. This inclosing-plate C may be secured by simply fitting its edges tightly within the parts $c\ c$ of the plate A, though it may be soldered to the latter plate. This plate C should be of zinc, or other metal which is a poor conductor of heat. It combines with the plate A to form a box, in which the pipe B is contained.

For melting purposes the plate A has four side, extending upward, forming a shallow pan. (Shown by dotted lines in Fig. 2.) Flanges may be riveted thereto for securing it to a table, and the sides of the inclosing-plate C may be made to extend up enough to embrace tightly the outside of the turned-up sides of the plate A, and be in this manner secured thereto, instead of to turned-down portions, like c c.

Having now described my invention, what I claim as new, and desire to secure by Letters Patent, is—

1. A candy-heater consisting of a plate of metal having a steam-pipe of serpentine or coiled form secured to its back, substantially as and for the purpose herein described.

2. A candy-heater consisting of a top plate having a pipe of serpentine or coiled form secured firmly to its back, and a back plate attached to the top plate for inclosing said coil, substantially as and for the purpose herein described.

3. The combination, in a candy-heater, of the plate A, the serpentine or coiled steam-pipe B, applied to the back of said plate, and the straps d d, riveted to the said plate and for holding the said pipe thereto, substantially as herein shown and described.

4. The combination, in a candy-heater, of a metal box and coil of pipe inclosed in said box, substantially as herein described.

THOS. BURKHARD.

Witnesses:
FREDK. HAYNES,
ED. L. MORAN.